United States Patent [19]

Hara et al.

[11] Patent Number: 5,384,340
[45] Date of Patent: Jan. 24, 1995

[54] MOISTURE-CURABLE AND PHOTOCURABLE SILICONE COMPOSITION

[75] Inventors: Osamu Hara, Tsukui; Kunihiko Nakajima, Machida, both of Japan

[73] Assignee: Three Bond Co., Ltd., Tokyo, Japan

[21] Appl. No.: 49,706

[22] Filed: Apr. 20, 1993

[30] Foreign Application Priority Data

Apr. 20, 1992 [JP] Japan .................. 4-143102

[51] Int. Cl.$^6$ ............ C08G 77/18; C08G 77/20; C08F 12/50
[52] U.S. Cl. .................. 522/99; 522/170; 522/172; 528/25; 528/26; 528/28; 528/32; 528/38
[58] Field of Search ........... 522/99, 172, 170; 528/25, 26, 28, 32, 34, 38

[56] References Cited

U.S. PATENT DOCUMENTS

| | | | |
|---|---|---|---|
| 4,045,416 | 8/1977 | Robson et al. | 522/172 |
| 4,293,397 | 10/1981 | Sato et al. | 522/99 |
| 4,528,081 | 7/1985 | Lien et al. | 522/99 |
| 4,563,539 | 1/1986 | Gornowicz et al. | 556/421 |
| 4,606,933 | 8/1986 | Griswold et al. | 522/99 |
| 4,697,026 | 9/1987 | Lee et al. | 522/99 |
| 4,698,406 | 10/1987 | Lo et al. | 528/12 |
| 4,921,926 | 7/1990 | Motegi et al. | 522/99 |

*Primary Examiner*—Susan Berman
*Attorney, Agent, or Firm*—Scully, Scott, Murphy & Presser

[57] ABSTRACT

A silicone composition having superior moisture- and photocurability and easy to manufacture is provided.

A polyorganosiloxane having primary amino, (meth)acryl or epoxy groups at both ends is reacted with a compound having two to three hydrolyzable groups and also having (meth)acryl or epoxy group in the case where the said end groups are primary amino groups, or also having a primary amino group in the case where the said end groups are (meth)acryl or epoxy groups, then the resulting reaction product is reacted with a compound having vinyl group and (meth)acryl, epoxy or isocyanato group, to prepare a polysiloxane having hydrolyzable groups and vinyl group, and this polysiloxane is combined with a photopolymerization catalyst and a moisture-curing catalyst.

4 Claims, No Drawings

MOISTURE-CURABLE AND PHOTOCURABLE SILICONE COMPOSITION

BACKGROUND OF THE INVENTION

The present invention relates to a silicone composition which can be cured by both moisture-curing and photocuring mechanisms.

Silicone as a soft cured material is used in various industrial fields requiring impact resistance, vibration resistance and thermal stress resistance, while making the most of its highly elastic performance, and thus it is a material of a high utility value. However, the conventional one-pack type silicone requires a considerable time for complete curing because it undergoes a condensation reaction in the presence of moisture to cure. To avoid this inconvenience, a silicone which cures upon exposure to light has recently been developed. For example, a silanol terminated organopolysiloxane is treated with an aminoalkoxysilane to replace the end with amino group, and glycidyl (meth)acrylate is added thereto, to render the siloxane photocurable (see Japanese Patent Laid Open No. 55-112262A). However, this reaction is a reaction between limited functional groups, and since alkoxysilane is used in the addition reaction, hydrolyzable groups are diminished and hence the moisture-curability is deteriorated. In Japanese Patent Laid Open No. 1-318028A, a photo- and moisture-curable composition is obtained by isocyanate linkage of a compound having acryl and alkoxysilyl-groups and a terminal hydroxyl modified silicone oil. But this composition also involves problems such as, for example, high viscosity and very poor handling property.

It is the object of the present invention to overcome such drawbacks of the prior art and provide a silicone composition easy to manufacture and having superior photo- and moisture-curability.

SUMMARY OF THE INVENTION

The present inventors found out that by adding a compound having hydrolyzable groups and a compound having a photocurable functional group to a specific reactive polyorganosiloxane, utilizing a difference in the reaction rate between primary and secondary amines, there could be obtained a cured product in either of a moisture-curing reaction and a photocuring reaction. In this way we accomplished the present invention.

The present invention comprises any of the following constructions a) to c):

a) A moisture-curable and photocurable silicone composition comprising a reaction product, a photopolymerization catalyst and a moisture-curing catalyst, the said reaction product being obtained by addition-reacting a reactive polysiloxane represented by the general formula

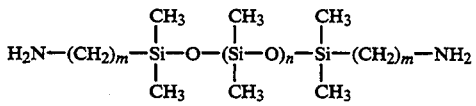

wherein m is 2 to 5 and n is 50 to 10,000, with a reactive silane compound having in one molecule two or three hydrolyzabale groups and (meth)acryl or epoxy group, in a quantitative relation of less than equivalent, and then addition-reacting the resulting addition reaction product with a compound having in one molecule at least one vinyl group and (meth)acryl, epoxy or isocyanato group.

b) A moisture-curable and photocurable silicone composition comprising a reaction product, a photopolymerization catalyst and a moisture-curing catalyst, the said reaction product being obtained by addition-reacting a reactive polysiloxane represented by the general formula

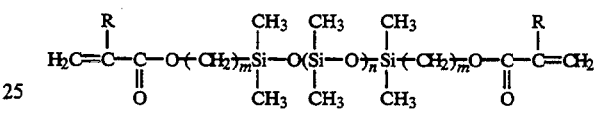

wherein R is H or $CH_2$ and n is 50 to 10,000, with a reactive silane compound having in one molecule two or three hydrolyzable groups and a primary amino group, in a quantitative relation of less than equivalent, and then addition-reacting the resulting addition reaction product with a compound having in one molecule at least one vinyl group and (meth)acryl, epoxy or isocyanato group.

c) A moisture-curable and photocurable silicone composition comprising a reaction product, a photopolymerization catalyst and a moisture-curing catalyst, the said reaction product being obtained by addition-reacting a reactive polysiloxane represented by the general formula

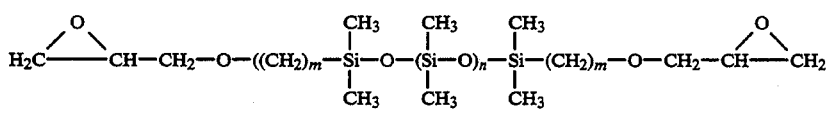

wherein m is 2 to 5 and n is 50 to 10,000 with reactive silane compound having in one molecule two or three hydrolyzable groups and a primary amino group, in a quantitative relation of less than equivalent, and then addition-reacting the resultig addition reaction product with a compound having in one molecule at least one vinyl group and (meth)acryl, epoxy or isocyanato group.

In the composition a), as examples of the reactive silane compound having in one molecule two or three hydrolyzable groups and (meth)acryl or epoxy group, there are mentioned γ-methacryloxypropyltrialkoxysilane,
γ-methacryloxypropylmethyldialkoxysilane,
γ-acryloxypropyltrialkoxysilane,
γ-acryloxypropylmethyldialkoxyilane,
β-glycidoxyethyltrialkoxysilane,
γ-glycidoxypropyltrialkoxysilane,
δ-glycidoxybutyltrialkoxysilane,
β-glycidoxypropyltrialkoxysilane, and
γ-glycidoxypropyltrialkoxysilane.

As alkoxy groups, those having 1 to 3 carbon atoms are preferred.

Further, as examples of the compound having at least one vinyl group in one molecule as a photocurable functional group and (meth) acryl, epoxy or isocyanate group as a group capable of reacting (polymerizing) with the amino groups, there are mentioned 2-isocyanatoethyl methacrylate, methacryloyl isocyanate, isopropenyl-2,-2-dimethylbenzyl isocyanate, triethylene glycol diacrylate, bisphenol A dimethylbenzyl isocyanate, triethylene glycol diacrylate, bisphenol A dimethacrylate, and glycidyl methacrylate.

In each of the compositions b) and c), instead of the ends of the reactive polysiloxane being not amino groups, it is necessary that the compound to be addition-reacted therewith should have amino group (primary amine).

As examples of the compound having in one molecule two or three hydrolyzable groups and a primary amino group there are mentioned ($\beta$-aminoethyl)-$\beta$-aminoethyltrialkoxysilane, aminopropyltrialkoxysilane and aminopropylmethyldialkoxysilane.

In the first-stage addition reaction, the hydrolyzable groups of the reactive silane compound do not participate in the reaction, and the resulting product contains the hydrolyzable groups and a secondary amino group created in the reaction (the ratio of the two is 1:1 in the case of using the compound in an amount of 0.5 mole equivalent). The amount of the reactive silane compound is usually in the range of 0.2 to 0.8 equivalent, particularly preferably about 0.5 equivalent.

In the second-stage addition reaction, the product obtained in the first-stage addition reaction, having hydrolyzable groups and a secondary amino group, is reacted with an amount less than equivalent of a compound having in one molecule at least one vinyl group as a photocuring functional group and also having, as another functional group, (meth)acryl, epoxy or isocyanato group, allowing an addition reaction of the secondary amino group with (meth)acryl, epoxy or isocyanato to take place, to obtain an addition reaction product having vinyl and hydrolyzable groups. The amount of the said compound is also in the range of usually 0.8 to 0.2 equivalent, particularly preferably about 0.5 equivalent.

As examples of the compound used in the second-stage reaction there are mentioned for example, methacryloyl isocyanate, 2-isocyanatoethyl methacrylate, isopropenyl-2,2-dimethylbenzyl isocyanate, glycidyl acrylate, glycidyl methacrylate and 1,6-hexane diacrylate, and isocyanato group-containing (meth)acrylates-obtained by reacting compounds each having two or more isocyanato groups such as, for example, 2,4-tolylene diisocyanate, 2,6-tolylene diisocyanate and 1,5-naphthalene diisocyanate, with hydroxyl group-containing (meth)acrylates such as, for example, 2-hydroxyethyl methacrylate and 2-hydroxypropyl methacrylate.

The thus-prepared polysiloxane having a photocuring functional group (vinyl group) and hydrolyzable groups at both ends is combined with a photopolymerization catalyst and a moisture-curing catalyst to obtain the composition of the present invention.

As the photopolymerization catalyst and the moisture-curing catalyst there may be used known ones. Examples of the photopolymerization catalyst include acetophenone, propiophenone, benzophenone, xanthol, fluorein, benzaldehyde, anthraquinone, triphenylamine, carbazole, 3-methylacetophenone, 4-methylacetophenone, 3-pentylacetophenone, 4-methoxyacetophenone, 3-bromoacetophenone, p-diacetylbenzene, 3-methoxybenzophenone, 4-allylacetophenone, 4-methylbenzophenone, 4-chloro-4-benzylbenzophenone, 3-chloroxanthone, 3,9-dichloroxanthone, 3-chloro-8-nonylxanthone, benzoyl, benzoin methyl ether, benzoin butyl ether, bis(4-dimethylaminophenyl)ketone, benzyl methoxy ketal and 2-chlorothioxanthone. As to the amount of the photopolymerization catalyst to be used, since all that is required is to merely make the polymerization system slightly photosensitive, the amount thereof may be in the range of 0.01 to 10 wt %, but generally it is preferable that the amount thereof be in the range of 0.1 to 5 wt %, based on the total weight of oligomer contained in the composition.

As examples of the moisture-curing catalyst there are mentioned metallic salts of organocarboxylic acids such as lead-2-ethyl octoate, dibutyltin acetate, dibutyltin dilaurate, butyltin tri-2-ethyl hexoate, iron-2-ethyl hexoate, cobalt-2-ethyl hexoate, manganese-2-ethyl hexoate, zinc-2-ethyl hexoate, stannous caprylate, tin naphthenate, tin oleate, tin butylate, tin naphthenate, zinc naphthenate, cobalt naphthenate and zinc stearate; organotitanates such as tetrabutyl titanate, tetra-2-ethylhexyl titanate, triethanolamine titanate and tetra(isopropenyloxy)titanate; organotitanium compounds such as organosiloxytitanium and $\beta$-carbonyltitanium; quaternary ammonium salts such as alkoxyaluminum compounds and benzyltriethylammonium acetate; lower fatty acids of alkali metals such as potassium acetate, sodium acetate and lithium oxalate; and dialkylhydroxylamines such as dimethylhydroxyamine and diethylhydroxyamine. The amount of the moisture-curing catalyst is in the range of 0.01 to 10 parts by weight, particularly preferably 0.1 to 5 parts by weight, based on the total weight of oligomer.

The composition of the present invention basically comprises the above components, but various additives may be incorporated therein if necessary. Particularly, the use of fumed silica is preferred in point of improving the physical properties of the composition when cured.

As a radical polymerization initiator there may be used not only a photopolymerization initiator but also a thermal polymerization initiator or a redox polymerization initiator, thereby allowing thermal polymerization or redox polymerization to take place. Further, for the adjustment of viscosity, there may be added dimethylsilicone oil or a reactive diluent.

EXAMPLE 1

5.1 g of $\gamma$-acryloxypropyltrimethoxysilane was added to 100 g of SILAPLANE FM3325 (molecular weight: 10,000, a product of Chisso Corporation) available commercially as a reactive polyorganosiloxane with reactive group X being amino, and reaction was allowed to proceed at 80° C. for 2 hours under nitrogen purge. Thereafter, the temperature was reduced to 50° C., 3.5 g of 2-isocyanatoethyl methacrylate was added and reaction was allowed to proceed under stirring for 1 hour. Further added were 1 g of 1-hydroxycyclohexylphenyl ketone as a photocuring catalyst and 0.5 of dibutyltin dilaurate as a moisture-curing catalyst, to afford a moisture- and ultraviolet-curable silicone composition.

EXAMPLE 2

5.3 g of glycidylpropyltrimethoxysilane was added to 100 g of SILAPLANE FM3325 (molecular weight 10,000, a product of Chisso Corporation) available commercially as a reactive polyorganosiloxane with reactive group X being amino, and reaction was allowed to proceed at 130° C. for 4 hours under nitrogen purge. Thereafter, the temperature was reduced to 50° C., 3.5 g of 2-isocyanatoethyl methacrylate was added and reaction was allowed to proceed under stirring for 1 hour. Further added were 1.0 g of dimethoxyacetophenone as a photocuring catalyst and 0.5 g of dimethyltin methoxide as a moisture-curing catalyst, to afford a moisture- and ultraviolet-curable silicone composition.

EXAMPLE 3

100 g of the reactive polyorganosiloxane used in Example 1 was reacted with 5.3 g of γ-acryloxypropyltrimethoxysilane at 80° C. for 2 hours under nitrogen purge. Thereafter, 5.1 g of 1,6-hexane diacrylate was added and reaction was allowed to proceed at room temperature for 1 hour under stirring. Further added were 1 g of dimethoxyacetophenone as a photocuring catalyst and tin octylate as a moisture-curing catalyst to afford a moisture- and ultraviolet-curable silicone composition.

EXAMPLE 4

100 g of the reactive polyorganosiloxane used in Example 1 was reacted with 5.3 g of glycidylpropylmethoxysilane at 130° C. for 4 hours under nitrogen purge. Thereafter, 1,6-hecane diacrylate was added and reaction was allowed to proceed at 80° C. for 2 hours with stirring under nitrogen purge. Further added were 1 g of dimethoxyacetophenone a photocuring catalyst and 0.5 g of dibutyltin dimethoxide as a moisture-curing catalyst to afford a moisture- and ultraviolet-curable silicone composition.

EXAMPLE 5

100 g of SILAPLANE FM7725 (molecular weight: 10,000, a product of Chisso Corporation) available commercially as a reactive polyorganosiloxane with reactive group X being methacryl was reacted with 5.0 g of 3-aminopropyltrimethoxysilane at 80° C. for 2 hours under nitrogen purge. Thereafter, 3.5 g of 2-isocyanatoethyl methacrylate was added and reaction was allowed to proceed at room temperature for 1 hour with stirring. Further added were 1 g of 1-hydroxycyclohexylphenyl ketone as a photocuring catalyst and 0.5 g of tin octylate as a moisture-curing catalyst to afford a moisture- and ultraviolet-curable silicone composition.

EXAMPLE 6

100 g of SILAPLANE FM5521 (molecular weight: 5,000, a product of Chisso Corporation) available commercially as a reactive polyorganosiloxane with reactive group X being epoxy was reacted with 2.5 g of 3-aminopropyltrimethoxysilane at 80° C. for 2 hours under nitrogen purge. Thereafter, 1.75 g of 2-isocyanatoethyl methacrylate as added and stirring was performed. Further added were 1 g of 1-hydroxycyclohexylphenyl ketone as a photocuring catalyst and 0.5 g of dimethyltin dimethoxide as a moisture-curing catalyst to addord a moisture- and ultraviolet-curable silicone composition.

The resin compositions obtained in the above Examples were each charged into a container of 5 mm deep by 150 mm by 150 mm and then irradiated under the conditions of 150 mW/cm$^2$×20 seconds, using a 4 KW high-pressure mercury vapor lamp. As a result, curing occurred. The cured product thus obtained was measured for hardness (JIS hardness A type), tensile strength and elongation. When a moisture-cured product not irradiated with ultraviolet ray was allowed to stand in an atmosphere held at a temperature of 25° C. and a humidity of 60%, the surface thereof cured into a tack-free state in 24 hours. Hardness (JIS hardness A type), tensile strength and elongation were measured after 7 days. The results are as shown in Table 1.

TABLE 1

| Example | 1 | 2 | 3 | 4 | 5 | 6 |
| --- | --- | --- | --- | --- | --- | --- |
| Ultraviolet-cured Product | | | | | | |
| Hardness (JIS-A) | 43 | 41 | 40 | 45 | 42 | 52 |
| Tensile Strength (kg/cm$^2$) | 2.6 | 3.7 | 2.7 | 2.9 | 2.6 | 2.6 |
| Elongation (%) | 125 | 120 | 130 | 125 | 120 | 115 |
| Moisture-cured Product | | | | | | |
| Tack-Free (hr) | 20 | 19 | 23 | 19 | 23 | 19 |
| Hardness (JIS-A) | 26 | 30 | 31 | 28 | 28 | 35 |
| Tensile Strength (kg/cm$^2$) | 3.8 | 4.2 | 3.6 | 3.4 | 3.6 | 2.8 |
| Elongation (%) | 150 | 140 | 145 | 150 | 145 | 135 |

What is claimed is:

1. A moisture-curable and photocurable silicone composition comprising at least one organopolysiloxane, a photopolymerization catalyst and a moisture-curing catalyst, said organopolysiloxane being selected from the group consisting of:

(a) a reaction product obtained by addition-reacting a reactive polysiloxane represented by the following general formula (I):

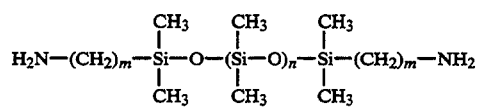

wherein m is 2 to 5 and n is 50 to 10,000, with a reactive silane compound having in one molecule two or three hydrolyzable groups and (meth)acryl or epoxy group, in a quantitative relation of less than equivalent, and then addition-reacting the resulting addition reaction product with a second compound having in one molecule at least one vinyl group and at least one epoxy or isocyanato group;

(b) a reaction product obtained by addition-reacting a reactive polysiloxane represented by the following general formula (II):

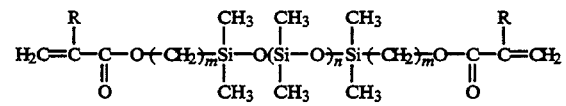

wherein R is H or CH$_3$, m is 2 to 5 and n is 50 to 10,000, with a reactive silane compound having in one molecule two or three hydrolyzable groups and a primary amino group, in a quantitative relation of less than equivalent, and then addition-reacting the resulting addition reaction product with a second compound having in one molecule at least one vinyl group and at least one (meth)acryl, epoxy or isocyanato group; and (c) a reaction product obtained by addition-reacting a reactive polysiloxane represented by the following general formula (III):

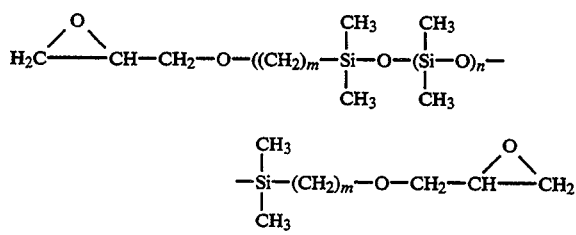

wherein m is 2 to 5 and n is 50 to 10,000, with a reactive compound having in one molecule two or three hydrolyzable groups and a primary amino group, in a quantitative relation of less than equivalent, and then addition-reacting the resulting addition reaction product with a second compound having in one molecule at least one vinyl group and at least one (meth)acryl, epoxy or isocyanato group.

2. The composition of claim 1, wherein the vinyl group is a (meth)acryl group.

3. The composition of claim 1, wherein the second compound has one vinyl group and one epoxy group or isocyanate group.

4. The composition of claim 3, wherein the vinyl group is a (meth)acryl group.

* * * * *